United States Patent Office 2,950,769
Patented Aug. 30, 1960

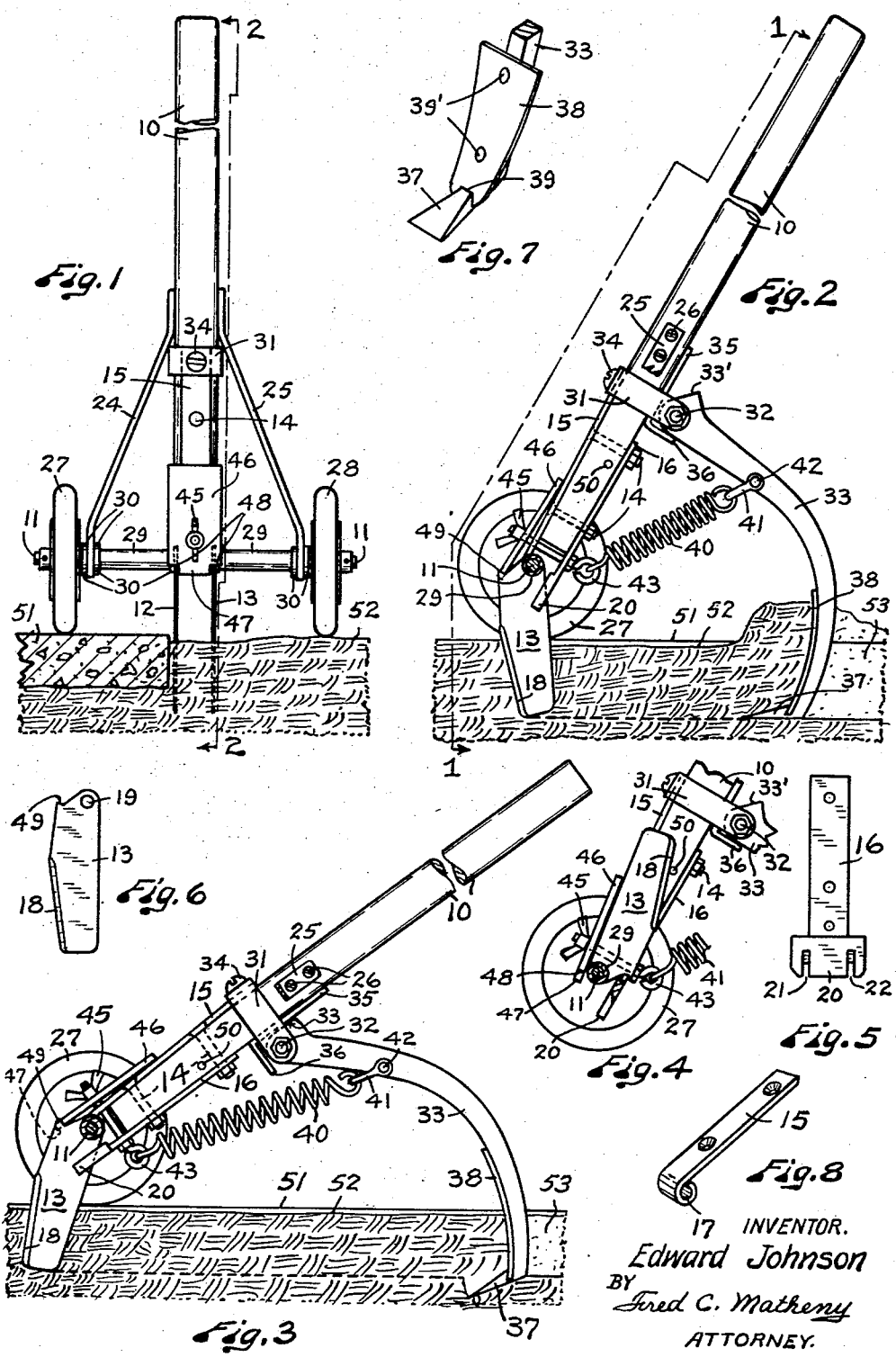

2,950,769

LAWN EDGING DEVICE

Edward Johnson, 84 Union St., Seattle, Wash.

Filed Aug. 5, 1959, Ser. No. 831,745

6 Claims. (Cl. 172—17)

My invention relates to a lawn edging device for use on a lawn to trim the sod and open up a narrow, shallow trench along the edge of a sidewalk.

An object of my invention is to provide a lawn edger constructed so that leverage can be applied to move the tool forwardly through the ground along the edge of a walk by using the handle of the tool as a lever and imparting swinging movement to said handle.

Another object is to provide a lawn edging device having a combined fulcrum member and trench opener which serves as a pivotal support about which a handle of the device can be swingingly moved downwardly in forcing cutting blades forwardly through the ground and which, on the upward movement of the handle, serves as a spring actuated trench opening device and completes the section of trench cut by the blades on the previous downward swinging movement of the handle.

Another object of my invention is to provide a lawn edging device which is entirely operated by hand and in which it is not necessary to use the feet on any part of the device.

In a general way my lawn edging device comprises a lever type handle supported by two wheels, two closely spaced apart flat parallel vertical cutting blades rigidly connected with the lower end portion of the handle and positioned about mid way between the wheels and extending a substantial distance below the lower peripheral portion of the wheels, and a combined fulcrum member and trench opening tool pivotally connected with the handle upwardly from the blades and having a spring urging it toward the blades, said fulcrum member and trench opening tool functioning as a pivotal support for the handle on the downward swinging movement of the handle and as a spring actuated trench opening tool on the upward movement of the handle.

Other objects of my invention will be apparent from the following description and accompanying drawings.

In the drawings Figure 1 is a front view of my lawn edging device, taken substantially on broken line 1—1 of Fig. 2, showing the same applied to a lawn along the edge of a sidewalk.

Fig. 2 is a side view, with parts in section, taken substantially on broken line 2—2 of Fig. 1.

Fig. 3 is a side view similar to Fig. 2 but showing the parts in the position they would occupy at the end of a cutting stroke.

Fig. 4 is a fragmentary side view showing blade members in a folded and inoperative position.

Fig. 5 is a detached plan view of a lower bracket member.

Fig. 6 is a detached elevational view of one of the knives.

Fig. 7 is a fragmentary detached perspective view of the lower end portion of a combined fulcrum member and trench opening tool showing a trench bottoming foot and a shovel.

Fig. 8 is a detached perspective view of an upper axle supporting bracket.

Like reference numerals refer to like parts throughout the several views.

My lawn edging device comprises a strong and substantial handle 10 having a transverse axle 11 and two flat, parallel, spaced apart cutting blades 12 and 13 rigidly secured to its lower end. One satisfactory way to mount the axle and cutting blades 12 and 13 to the lower end of the handle 10 is to secure to the lower end portion of said handle, by bolts 14, an upper axle supporting bracket 15 and a lower blade positioning and stabilizing bracket 16. Both brackets 15 and 16 overhang the lower end of the handle 10. The overhanging end portion of the upper bracket 15, Fig. 8, is bent in tubular shape to form a supporting member 17 which receives and helps to support the axle 11. The blades 12 and 13 are preferably made of fairly hard, thin steel, have sharpened forward edges 18 and have perforations 19, Fig. 6, in their upper ends which fit over the axle 11. This mounts said blades 12 and 13 so that they are firmly supported but can be pivotally moved from an operative position, Figs. 1, 2 and 3, to an inoperative or folded position, Fig. 4.

The lower bracket 16, shown detached in Fig. 5, has a forward end part 20 which is thickened and widened and provided with two spaced apart notches 21 and 22 to receive the respective blades 12 and 13 when said blades are in the operative or cutting position, as shown in Figs. 1, 2 and 3. The notches 21 and 22 afford transverse support to the blades at locations well below the axle 11 and the back pressure to which the blades are subjected when they are being pushed forwardly through the ground is borne by the bottoms of the notches 21 and 22.

The outer end portions of the axle 11 pass through and are supported by two brace members 24 and 25 which are inclined relative to the handle 10 and have their upper ends fixedly secured to said handle at a substantial distance above the axle 11 by screws 26. Wheels 27 and 28 are rotatively mounted on the axle 11 outwardly from the brace members 24 and 25. Spacing tubes 29 are provided on the axle 11 between the respective blades 12 and 13 and the lower end portions of the respective brace members 24 and 25. Preferably washers 30, Fig. 1, are provided on the axle 11 between the several parts which are assembled thereon.

A bracket member 31 is secured to the handle 10 a substantial distance above the lower end thereof and supports a pivot member 32. The upper end portion of a combined fulcrum member and trench opener 33 is pivotally mounted on the pivot member 32. The form of the bracket 31 can be varied but said bracket is herein shown as being in the form of a band which extends around the handle 10 and is secured thereto by a screw 34. A stop plate 35 is secured to the under side of the handle 10 and has a downturned end 36 forming a stop to limit pivotal movement of the fulcrum member and trench opener 33 toward the blades 12 and 13. Pivotal movement of said fulcrum member and trench opener 33 in the opposite direction is limited by engagement of a shoulder 33' on the upper end of said fulcrum member and trench opener 33 with the stop plate 35. Obviously the stop plate and bracket member can be made in one piece and the shape and arrangement of the stop means can be varied.

A trench bottoming foot 37 is formed on the lower end of the fulcrum member and trench opener 33 and a forwardly facing plow or shovel 38 extends from the bottom of said fulcrum member upwardly along the forward edge of said member 33 for a substantial distance. The trench bottoming foot 37 forms a base of substantial area on the lower end of the member 33 and also functions as a share and is adapted to cut through the soil along the bottom of a trench or furrow which is being opened up alongside of a sidewalk 51. The shovel member 38, Fig. 7, is slightly curved, is convergently tapered from top to bottom, has a notch 39 which fits over the foot member 37 and can be secured to the fulcrum member 33 by screws 39'. It is also possible to make this shovel 38 integral with the member 33. This shovel 38 helps to push out of the trench soil which has been cut loose by the blades 12 and 13 and foot member 37.

A tension spring 40 has one end secured by a clevis 41 and pivot 42 to the fulcrum member and trench opener 33 and has its other end connected by an eye bolt 43 with the brackets 15 and 16 at the lower end of the handle assembly. The spring 40 urges the member 33 toward the knives 12 and 13. The eye bolt 43 has a wing nut 45 on its upper end and said eye bolt 43 serves as an anchor member for a blade holding plate 46. The plate 46 has a narrower lower end or tip portion 47, Fig. 1, which fits between the two knives 12 and 13 when said blades are in their operative position shown in Figs. 1, 2 and 3. Said plate 46 also has knife holding shoulders 48 which engage with shoulders 49 on the knives 12 and 13 and hold said knives down in their operative position. The knives 12 and 13 can be folded by removing the knife holding plate 46 and rotatively moving said knives clockwise from the position in which they are shown in Figs. 2 and 3 to the position in which they are shown in Fig. 4. A stop member 50, one of which is shown in Figs. 2, 3 and 4, is provided to limit folding movement of each knife 12 and 13. The knives 12 and 13 are held in their folded positions by replacing the knife holding plate 46 over them and tightening the wing nut 45.

In the operation of this lawn edging device one wheel 27 runs on the sidewalk 51 and the other wheel 28 runs on the lawn 52 and the blades 12 and 13 penetrate and cut through the ground along the edge of the walk. The trench bottoming tool 37 and the shovel 38 follow said blades and complete the opening up of a trench 53. The blades 12 and 13 are advanced by a pumping action of the handle 10 with said handle serving as a lever and the member 33 serving as a fulcrum member. The spring 40 normally holds the fulcrum member and trench opener 33 as close to the knives 12 and 13 as the stop 36 will permit. The blades 12 and 13 preferably extend from two to three inches below the lower peripheral portion of the wheels 27 and 28. In starting a cut the blades 12 and 13 and bottoming foot 37 are placed on the ground alongside of a walk 51 with the wheels elevated above the walk and the ground. The operator then exerts a downward pressure on the lever 10 tending to angularly move said lever 10 about the pivot member 32 while holding the blade carrying end of said lever down. This moves the blades 12 and 13 forwardly and at the same time they cut into the ground so that, by the end of the first stroke, one wheel 27 will ordinarily rest on the walk 51 and one wheel 28 on the lawn 52, the spring 40 will be extended and tensioned and the fulcrum member 33 will be at a maximum distance away from the blades 12 and 13 with the stop shoulder 33' resting against the plate 35. The operator then moves the lever 10 upwardly and forwardly about the axle 11 as a fulcrum, without allowing the wheels to move either forwardly or upwardly or rearwardly. When he does this the spring 40 swingingly moves the fulcrum member and trench opener 33 forwardly and the trench bottoming foot 37 and shovel 38 will enter the ground to a depth about equal to the depth of cut of the blades. This brings the parts into a position approximately as shown in Fig. 2. The operator then continues to use the handle 10 as a lever to which he imparts downward and upward movements in alternately moving the blades forwardly in the ground with the member 33 serving as a fulcrum on each downward stroke of said lever and with the trench bottom foot 37 and shovel 38 moving forwardly in the trench, due to the pull of the spring 40, on each upward movement of the lever.

Preferably the handle 10 is at least forty inches long and the distance from the lowermost tips of the blades 12 and 13 to the pivot member 32 is about ten or eleven inches. This makes available a powerful leverage for moving the blades forwardly in the ground on the down stroke of the lever. It is possible for a person of ordinary strength to use this device, without excessive effort or strain, to open up a trench along the edge of a walk through tough hard sod. The foot member 37 serves the double function of a fulcrum member base of fairly large area, which will not unduly penetrate the ground on the down stroke of the handle 10, and a trench bottoming tool which will cut the earthy material along the bottom of the trench 53 on the up stroke of the handle 10. The shovel 38 will push most of the severed material out of the trench 53 as the member 33 moves forwardly therein. The device is readily operated by the hands with the handle 10 and does not require the application of the feet to said device. If force is properly applied by hand to the handle 10 the device will not tend to come out of the ground, either on the downward or the upward stroke of said handle.

If it is desired to make a single knife cut instead of making two parallel spaced apart knife cuts and opening up a trench alongside of a sidewalk then one of the blades, for instance the blade 13, can be turned up into an inoperative position, as shown in Fig. 4, and the other blade 12 can be left in the cutting position in which it is shown in Fig. 1. When the device is thus used to make a single knife cut but not a trench along the edge of a sidewalk the trench bottoming foot 37 is preferably shielded in such a manner that it will slide along on top of the ground but will not dig into the ground. One way to shield said foot 37 is to slip a short piece of rubber hose of proper diameter over it. The fulcrum member 33 will then operate as previously described to provide pivot means for the handle 10 by which leverage may be exerted to advance the knife through the ground along the edge of a sidewalk with the shielded foot 37 moving along on top of the ground but not digging into the ground or injuring the grass in its path. Thus the lever action provided by my lawn edger can be used in making a single knife cut long the edge of a sidewalk.

The foregoing description and accompanying drawings clearly disclose a preferred embodiment of my invention but it will be understood that this disclosure is merely illustrative and that changes may be made within the scope of the following claims.

I claim:

1. A lawn edging device comprising two spaced apart wheels; a handle connected with said wheels; two normally upright flat parallel spaced apart blades rigidly connected with the lower end portion of said handle and positioned between between said wheels and extending below said wheels; a combined fulcrum member and trench opening tool pivotally connected with said handle at a substantial distance upwardly from said blades; a trench bottoming foot on the lower end of said fulcrum member and trench opening tool; and a spring urging said fulcrum member and trench opening tool toward said blades.

2. The apparatus as claimed in claim 1 in which stop devices are provided on the handle and on the fulcrum member and trench opening tool adjacent the point of their pivotal connection limiting relative swinging movement in two directions between said handle and said fulcrum member and trench opening tool.

3. A lawn edging device for opening up a narrow trench in a lawn along the edge of a sidewalk comprising two coaxial spaced apart wheels arranged to be operated one on a sidewalk and the other on a lawn alongside of the sidewalk; a handle connected with said wheels; two normally upright flat parallel blades spaced apart a distance equal to a predetermined width of a trench to be opened up along the edge of the sidewalk and rigidly connected with the lower end portion of said handle and positioned approximately mid way between said wheels and extending below said wheels; a combined fulcrum member and trench opening tool pivotally connected with said handle at a substantial distance upwardly from said blades; a trench bottoming foot on the lower end of said fulcrum member and trench opening tool forming a fulcrum member base of substantial area; stop means on the handle and on the fulcrum member and trench opening tool adjacent the point of their pivotal connection limiting swinging movement of said fulcrum member and trench opening tool in two directions relative to said handle; and a spring urging said fulcrum member and trench opening tool toward said wheels, said handle functioning as a lever swingingly movable about the pivot member connecting it with said fulcrum member and trench opening tool.

4. A lawn edging device for opening up a narrow trench in a lawn along the edge of a sidewalk comprising two coaxial spaced apart wheels arranged to be operated one on a walk and the other on a lawn alongside of the walk; a handle supported by said wheels; two normally upright flat parallel blades spaced apart a distance equal to a predetermined width of a trench to be opened up along the edge of the sidewalk and rigidly connected with the lower end portion of said handle and positioned approximately mid way between said wheels and extending below said wheels; a combined fulcrum member and trench opening tool pivotally connected with said handle at a substantial distance upwardly from said blades and having a trench bottoming foot providing a fulcrum member base of substantial area and capable of forming the bottom of a trench; a shovel member secured to the lower end portion of said fulcrum member and trench opening tool and extending upwardly from the trench bottoming foot thereof; stop means on the handle and on the fulcrum member and trench opening tool adjacent the point of their pivotal connection limiting swinging movement of said fulcrum member and trench opening tool relative to said handle in two directions; and a spring urging said fulcrum member and trench opening tool toward said blades, said handle functioning as a lever and being swingingly movable rearwardly and downwardly in forcing said cutting blades forwardly through the ground and said spring moving the lower end portion of said fulcrum member and trench opening tool along the trench in opening up said trench when the handle is swingingly moved upwardly and forwardly.

5. The apparatus as claimed in claim 4 in which the blades are pivotally connected with the handle and extend outwardly and downwardly from the lower end of the handle when in a cutting position and are foldable alongside of the handle; and in which a blade holding plate is removably attached to the top side of the handle and cooperates in holding the blades in a cutting position and in a folded position.

6. A lawn edging device for opening up a narrow trench in a lawn along the edge of a sidewalk comprising a handle; an axle secured to the lower end of said handle and extending crosswise thereof; two wheels rotatively mounted on the respective end portions of said axle capable of being operated one on a sidewalk and the other on a lawn alongside of the sidewalk; two flat parallel blades pivotally mounted on said axle substantially in alignment with said handle and spaced apart a distance equal to a predetermined width of a trench to be made along the edge of the sidewalk, said blades extending outwardly and downwardly from the end of the handle when in a cutting position and being foldable alongside of the handle; a blade positioning and supporting bracket secured to the lower side of said handle and extending beyond the lower end of said handle and beyond said axle, said bracket having slots receiving said blades and said bracket limiting downward movement of said blades and transversely supporting said blades when said blades are in cutting position; a blade holding plate removably attached to the handle adapted to hold the blades in a cutting position and in a folded position; a combined fulcrum member and trench opening tool pivotally connected with said handle at a substantial distance upwardly from said blades and having a trench bottoming foot providing a fulcrum member base of substantial area, said foot being capable of cutting along the bottom of a trench; stop means on the handle and on the fulcrum member and trench opening tool adjacent the point of their pivotal connection limiting swinging movement of said fulcrum member and trench opening tool relative to said handle in two directions; a spring urging said fulcrum member and trench opening tool toward said blades, said handle functioning as a lever and being swingingly movable rearwardly and downwardly in forcing said cutting blades forwardly through the ground and said spring moving the lower end portion of said fulcrum member and trench opening tool along the trench in opening up said trench when the handle is swingingly moved upwardly and forwardly.

References Cited in the file of this patent

UNITED STATES PATENTS

| | | |
|---|---|---|
| 1,338,123 | Coniglio | Apr. 27, 1920 |
| 1,419,312 | Seagrave | June 13, 1922 |
| 2,844,084 | Greenland | July 22, 1958 |